Jan. 31, 1967  J. W. RYAN ETAL  3,301,575
SUSPENSION FOR TWO-WHEELED VEHICLE
Filed Jan. 4, 1965  5 Sheets-Sheet 3
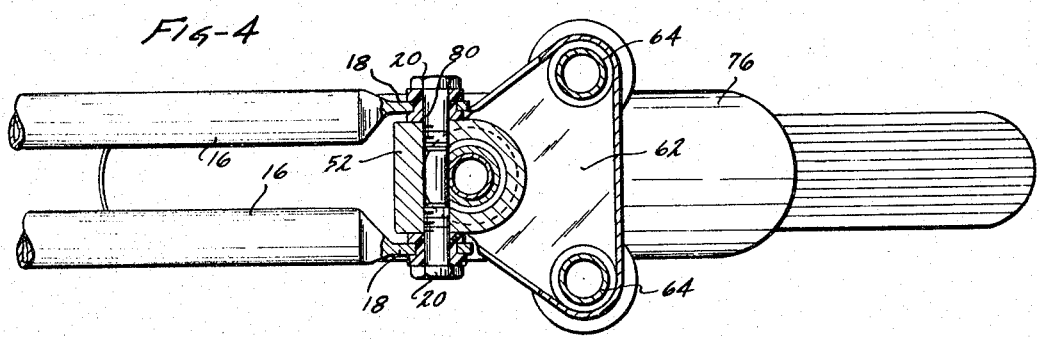
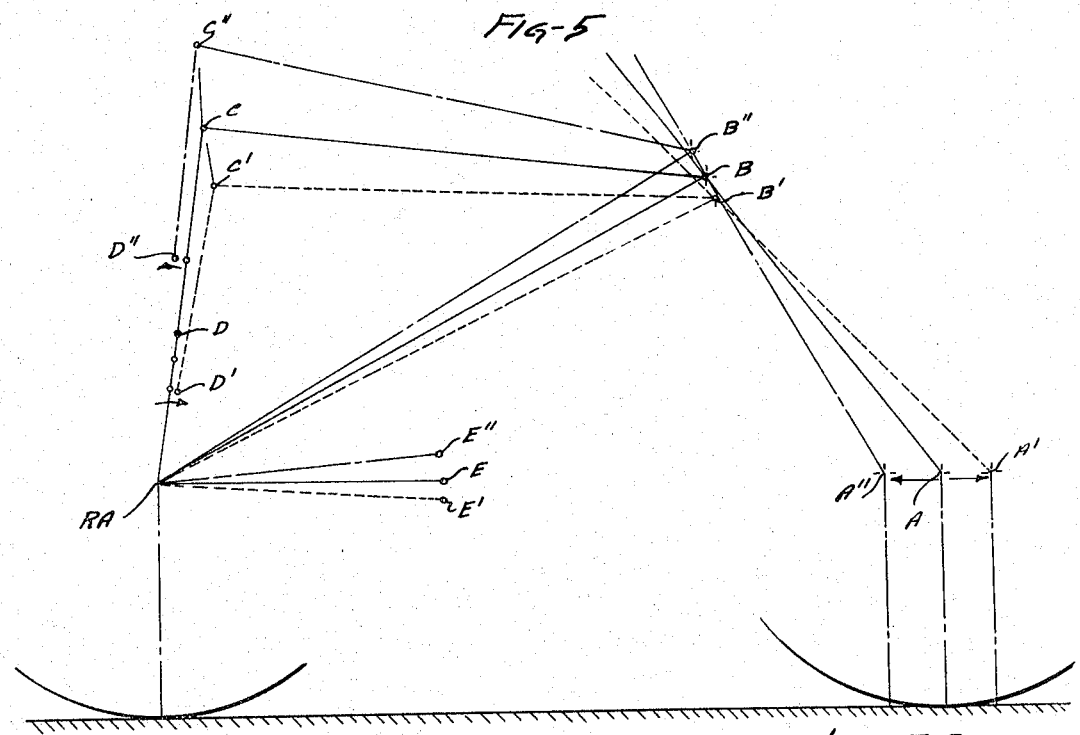
INVENTORS
JOHN W. RYAN
JAMES DALE MOORE
WARREN DALE KABOT
BY  Herzig & Walsh
ATTORNEYS

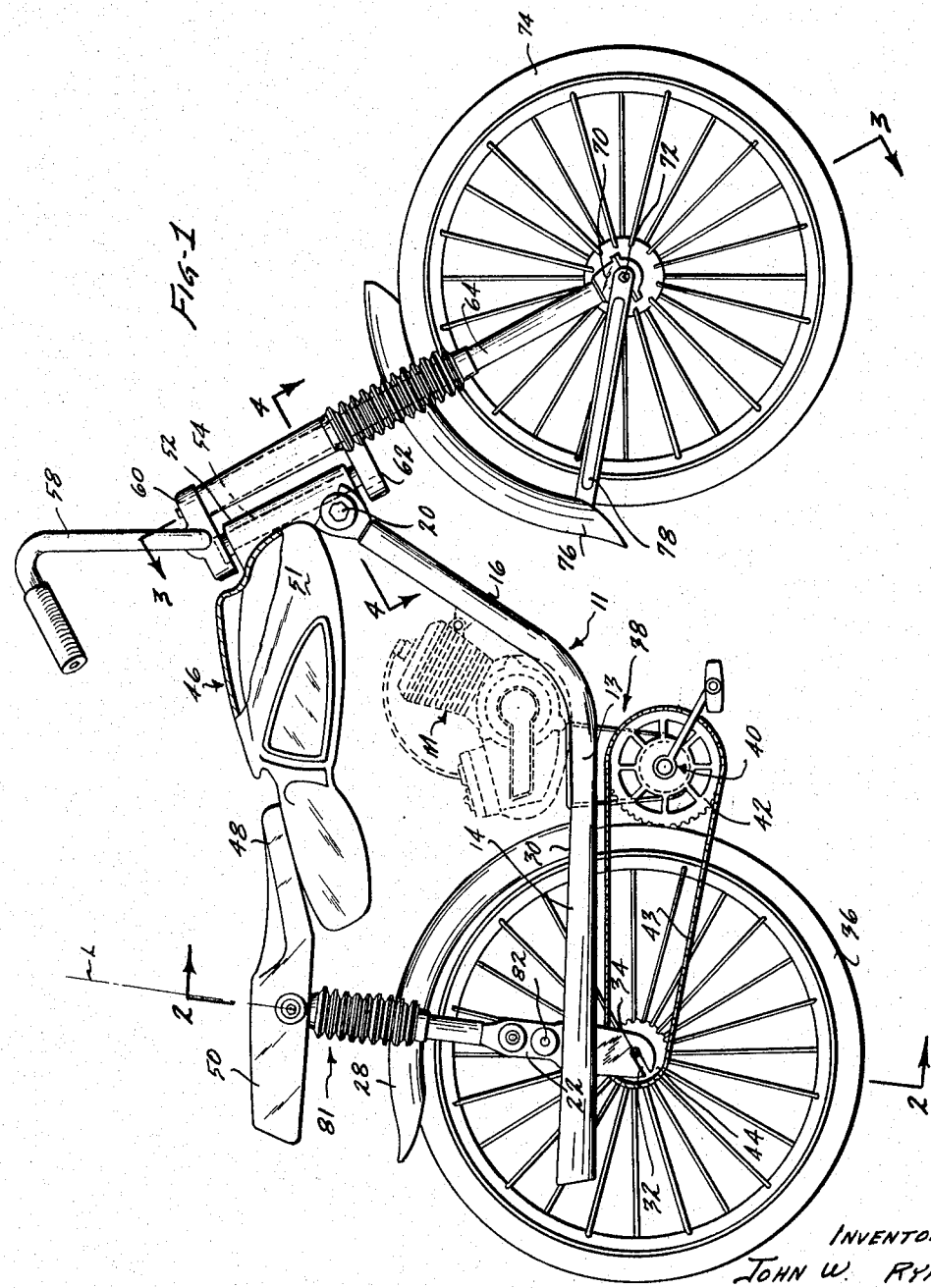

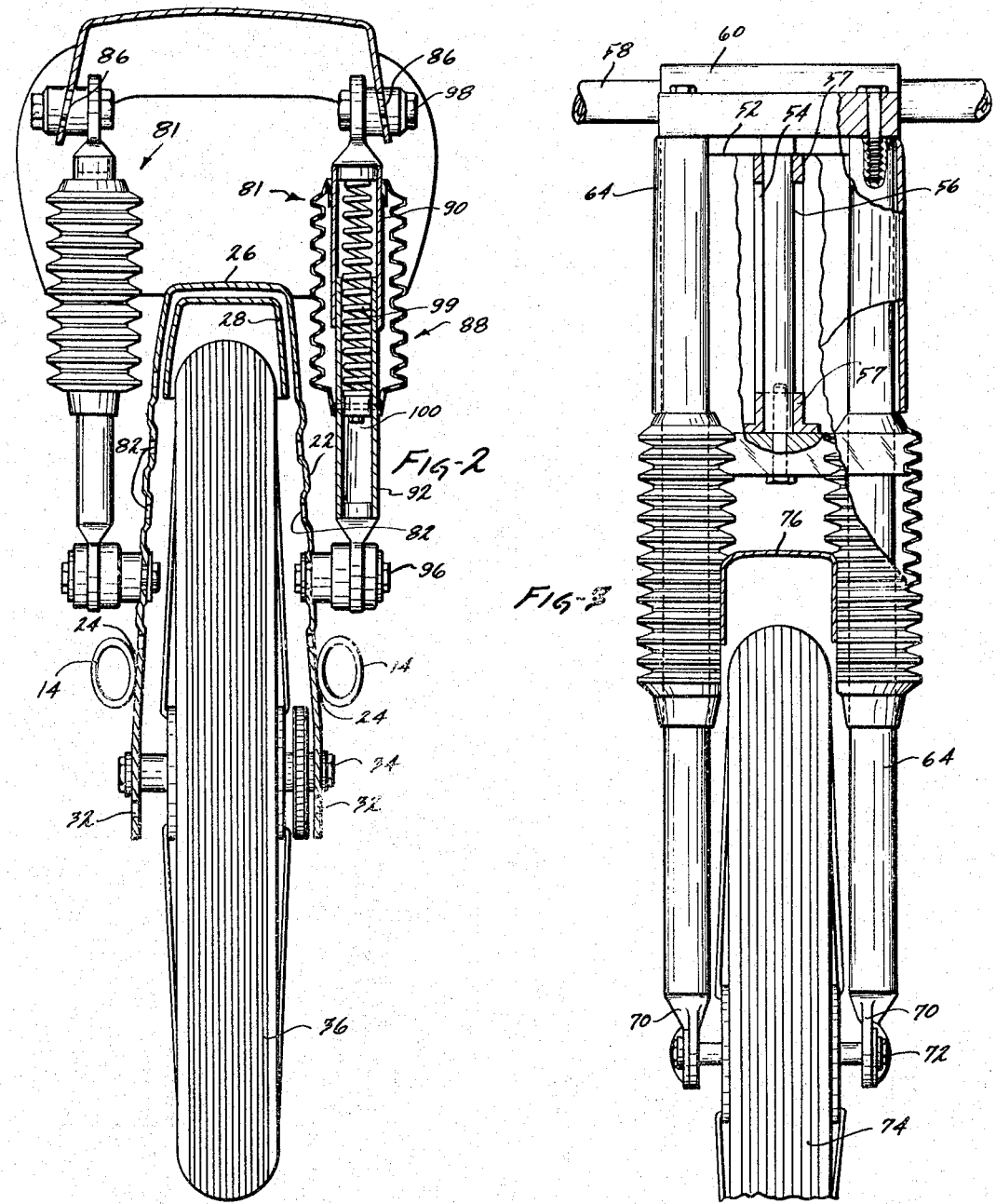

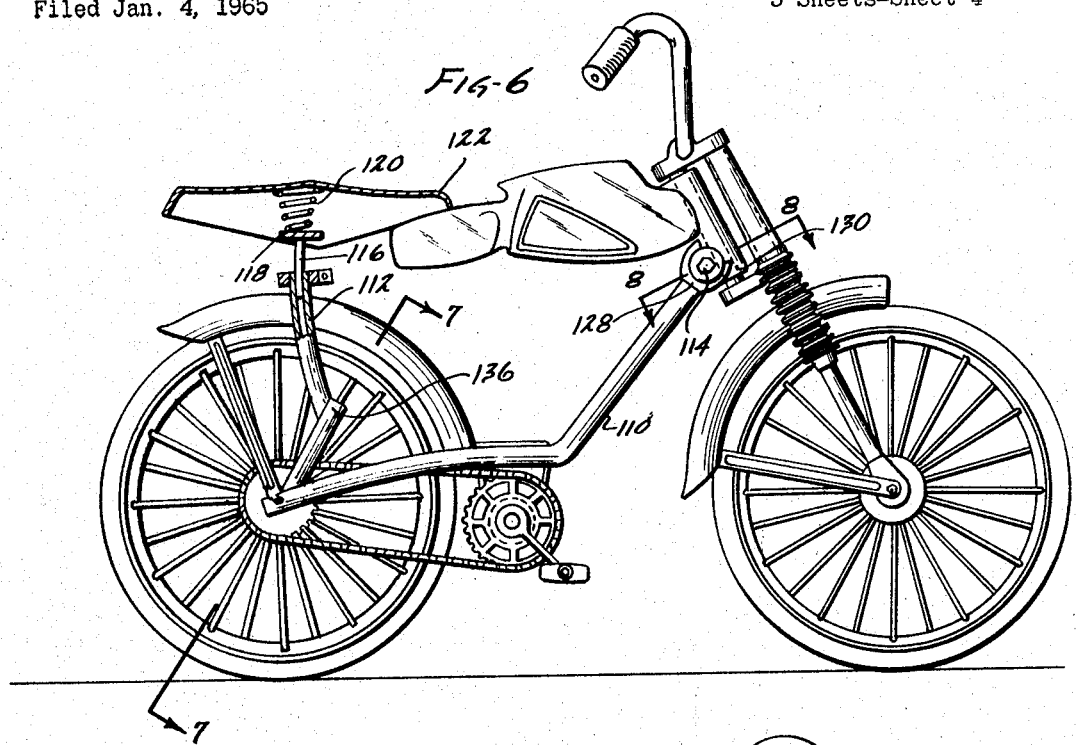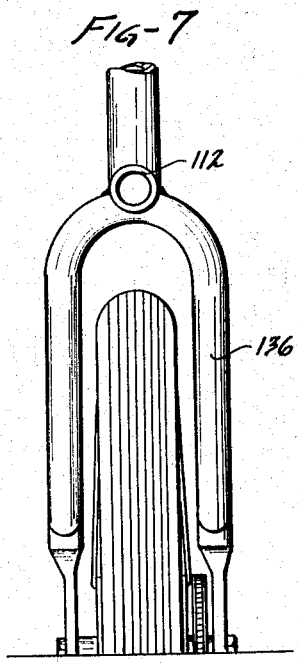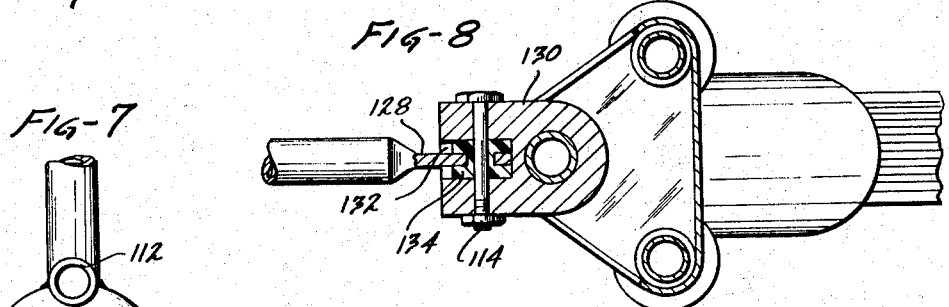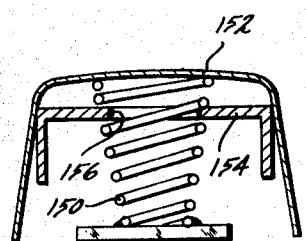

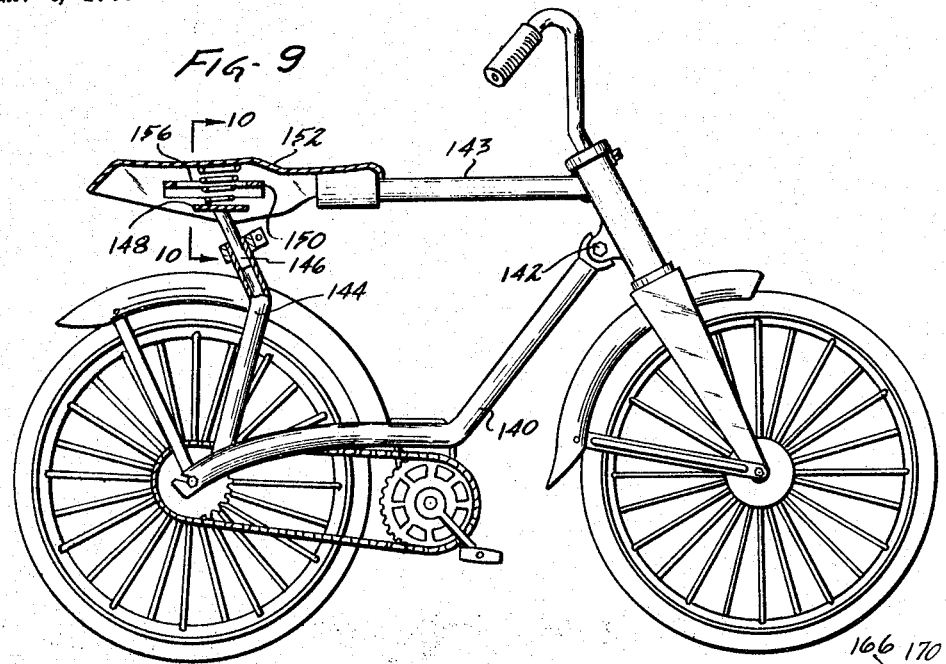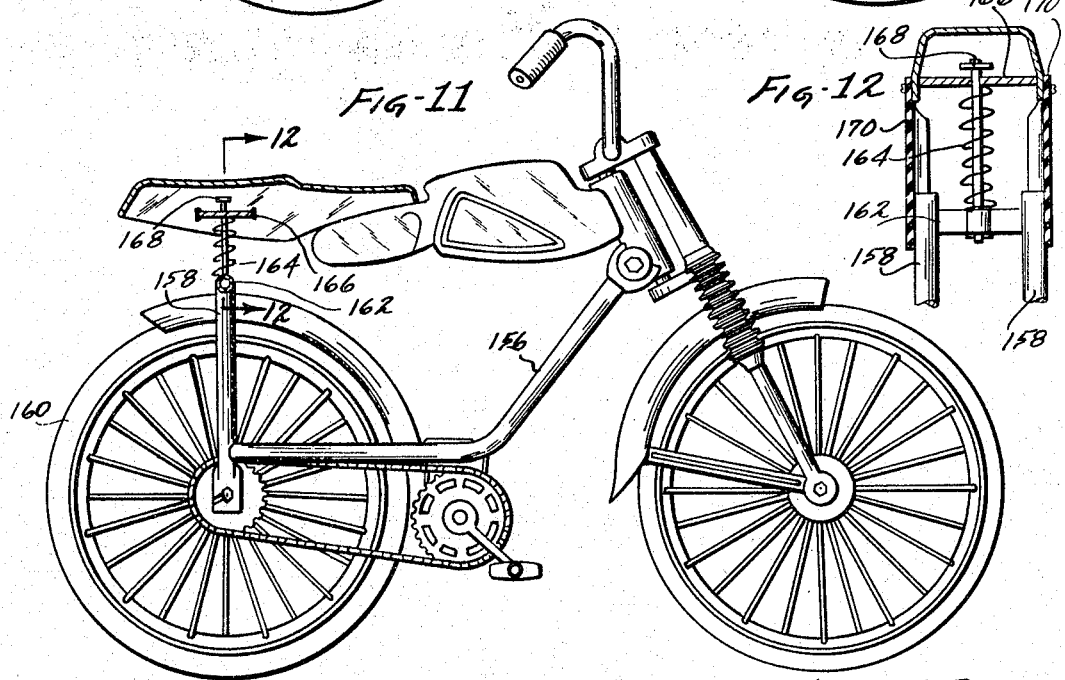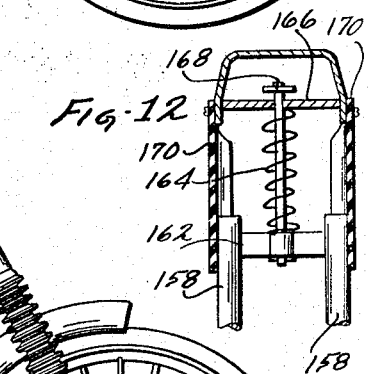

United States Patent Office 3,301,575
Patented Jan. 31, 1967

3,301,575
SUSPENSION FOR TWO-WHEELED VEHICLE
John W. Ryan, Bel Aire, James Dale Moore, Sherman Oaks, and Warren Dale Kabot, Manhattan Beach, Calif., assignors to Mattel, Inc., a corporation of California
Filed Jan. 4, 1965, Ser. No. 422,898
13 Claims. (Cl. 280—275)

The invention relates to wheeled vehicles and is particularly directed to multiple wheeled vehicles comprising a plurality of pivotally inter-connecting frame members and a suspension arrangement therefor.

The invention as disclosed has been particularly applied to two-wheeled bicycles, though it will be apparent to those skilled in the art, that it may be applied to other wheeled vehicles such as light motorcycles or other vehicles having fore and aft axes of wheel rotation.

Conventional bicycles, traditionally have employed a rigid frame having fore and aft wheels journally fixed to that rigid frame for rotation relative thereto. Characteristically, the frame carries a seat for rider occupancy, the latter being resiliently mounted on the frame to provide a degree of rider comfort. Seat height variation has been provided to accommodate riders of differing physique. The sprung seating arrangement is carried by a movable tubular member telescopically received in a second tubular member fixed to the frame. Friction means are provided to lock the two tubular members together. To achieve adjustment, the friction means were loosened and the relative position of the tubes varied to offer height variation. The front fork construction also employed telescopically inter-connected members, again, frictionally lockable together, so that the handle bar height may be vertically varied to bring it into a desired relationship with the seat. In all other aspects the physical dimensions of the vehicle remained constant.

Riding characteristics and use flexibility of the bicycles described are relatively minimal. For example, when rough terrain is encountered riding comfort is decreased substantially. Shock loads encountered during operation are transmitted directly to the relatively rigid frame without cushioning. Structural failure has frequently resulted particularly in the area of joinder of the front fork assembly and the frame. Height adjustment offered by seat and handle bar variation is incomplete for riders of different physiques in view of the fixed dimensional characteristics of the other aspects of the structural bike.

Because of the relatively rough riding characteristics of the prior art structures described as well as structural failure induced by shock loads transmitted from the wheels to the frame, many attempts were made to provide cushioning or springing devices between the ground encountering wheels and the central rider carrying frame. Most frequently, the wheels were independently sprung from the frame to accommodate independent wheel action as road obstacles were encountered. Needless to say the devices of this nature, though reasonably effective, are frequently complex and expensive to install and maintain. Also independent front wheel suspension requires complex steering mechanism design that tends to affect the riding characteristic of the vehicle, for example, making it more difficult to steer and maneuver.

Accordingly, it is a primary object of the invention to provide a wheeled vehicle of multi-frame construction structurally arranged to accommodate relative movement between the frames.

It is a further object of the invention to provide a multi-frame wheeled vehicle formed and arranged to accommodate relative movement between the frames and secondarily joined to offer control of the relative position of the frames.

It is a further object of the invention to provide a multi-frame or jointed framed vehicle wherein the position control between the frames includes resilient means offering a flexural quality to the relative frame movement to thereby importantly improve the riding quality of the vehicle including the efficient distribution of pedal torque to the driving wheel.

Specifically, it is an object of the invention to provide a bicycle having first and second pivotally connected frames, each of said frames journally supporting a rotatable wheel. The frames are secondarily joined by combined resilient and selectively variable means so that frame position may be adjusted to vary both the height and relative positions of the operating parts and thereby change the physical configuration of the vehicle to accommodate riders of varying physiques.

It is yet another object of the invention to provide a jointed multi-framed bicycle having a novel spring suspension interposed between the frames to effectively absorb shock loads as a result of encountering road objects thereby avoiding excessive frame stress and the progressive structural failure of prior art devices.

It is further an object of the invention to provide a multi-jointed frame bicycle of the type described structurally formed and arranged to simulate a motorcycle and thereby substantially enhance its play value for children.

It is yet another object of the invention to provide a vehicle of the type described incorporating a unique front fork and steering assembly.

These and other objects and advantages of the disclosed invention will become apparent in the course of the following description from an examination of the related drawings, wherein:

FIGURE 1 is a side elevational view of a first embodiment of the invention,

FIGURE 2 is a sectional view, in end elevation, taken along line 2—2 of FIGURE 1, FIGURE 3 is a front elevational sectional view taken along line 3—3 of FIGURE 1, FIGURE 4 is a sectional view taken along line 4—4 of FIGURE 1, FIGURE 5 is a free body line diagram illustrating the relative action of the vehicle components, FIGURE 6 is a partially fragmentary side elevational view of another modification of the invention.

FIGURE 7 is a sectional view taken along line 7—7 of FIGURE 6,

FIGURE 8 is a sectional view taken along line 8—8 of FIGURE 6.

FIGURE 9 is a partially fragmentary side elevational view of another modification of the invention, FIGURE 10 is a sectional view taken along line 10—10 of FIGURE 9, FIGURE 11 is a partially fragmentary side elevational view of yet another modification of the invention, and, FIGURE 12 is a sectional view taken along line 12—12 of FIGURE 11.

Describing the invention in detail, and directing attention to FIGS. 1–4, a lower frame is indicated generally at 11. In this embodiment, the frame 11 comprises a pair of horizontally spaced tubular elements 13—13. Each of these elements 13 has a lower generally horizontal segment 14 and an upwardly and forwardly directed segment 16. The upper terminus of the segments 16 are bifurcated to provide spaced journals 18 for an interconnecting pivot pin 20.

An inverted U-shaped strap element 22 (FIGURE 2) is secured in any conventional manner, as by welding or brazing, to the spaced segments 14 adjacent the rear ends thereof as at 24. As noted, the U-shaped strap element 22 has its open end directed downwardly and the upper or closed section thereof 26 receives and mounts one end of a fender element 28, the latter also being mounted to the spaced segments 14 as at 30.

A pair of wheel mounting slots 32 are formed in adjacent ends of the U-shaped strap element 22 and horizontally aligned below the related frame segments 14. The slots 32 receive axle 34 which is conventionally attached and which journally mounts the rear wheel element 36. It will be noted that the slots 32 are directed rearwardly of the vehicle and directed forwardly and upwardly. Thus the wheel 36 may be effectively centered in the strap 22 and between the segments 14.

Interposed between the frame segments 14—14 and secured thereto is a downwardly extending housing, indicated generally at 38. The housing 38 carries at its lower extremity a conventional pedal sprocket arrangement indicated generally at 40. The arrangement 40 includes conventional drive gear 42 for engaging transmission chain 43 which in turn is connected to a driven gear 44 associated with the rear wheel 36. In this conventional manner motive power is transmitted to the rear wheel 36.

A second frame is indicated generally at 46. The frame 46 comprises a generally horizontal upper element 48 extending generally longitudinally of the bicycle and overlying the rear wheel 36. The horizontal frame element 48 may incorporate an integral seat construction 50 at the aft portion thereof. Forwardly of the seat 50, the element 48 may be formed and arranged to simulate a gas tank 51. The front or forward terminus of the horizontal element 48 defines a journal housing 52, the latter incorporating an elongated bore 54 arranged to receive a steering column or rod 56. It will be noted that the bore 54 is directed vertically and rearwardly of the bicycle. Upper and lower bearings 57—57 accommodate rotation of the steering column 56.

It will be observed that the position of the seat with respect to the rear axle 34 is such that the center of gravity of the rider's body is directly or substantially directly over the rear axle such that a vertical line projected from the rear axle would pass directly or substantially directly through the center of gravity of the rider's body. This geometrical relationship exists in the further forms or modifications of the invention described hereinafter as well.

Handle bar means 58 are secured in any conventional manner to an upper cap or bracket 60, the latter being vertically spaced from a lower cap or bracket 62. Spaced bars 64, 64, positioned forwardly of column 56 join brackets 60 and 62. Steering rod or column 56 has its upper and lower ends fixedly connected to the brackets 60 and 62 respectively. A steering assembly is thus provided offering high strength and resistance to impact load and providing double bar structure simulating motorcycle construction. Such features enhance the bicycle's utility from both the standpoint of use as a child's play device and its intrinsic play value.

The bars 64, 64 generally parallel each other and extend downwardly, as seen in FIGURE 3 to provide axle mounting brackets 70, 70. The brackets 70 conventionally receive opposed ends of axle 72, the latter rotatably carrying front wheel 74. A front fender 76 is interposed between the bars 64 and is connected thereto. An axle mounted bracket 78 supports the other extremity of the fender 76.

Attention is now directed to FIGURE 4 and the housing 52 which provides the steering assembly for the bicycle. It will be recalled that a generally horizontal pivot pin 20 is carried at the upper end of the segments 16 of the first frame 11. The pin 20, additionally, is received in horizontal bore 80 of the housing 52. Thus pin 20 provides a pivotal connection between the first frame 11 and the second frame 46 immediately adjacent the axis of steering 56. In this manner relative movement between the frames is accommodated.

To control the relative movement between the frames 11 and 46 adjustable means, indicated generally at 81, are provided. Considering FIGURES 1 and 2, the U-shaped bracket 22 has a plurality of generally vertically arranged, uniformly spaced mounting holes 82, 82. The holes 82 are horizontally aligned in pairs on opposed sides of the bracket 22. Additionally, the seat 50, which occupies the rear portion of the frame segment 48, has opposed generally horizontally aligned apertures 86, 86.

Adjustable means 81 include shock absorbing devices, indicated generally at 88, 88. Each shock absorbing device comprises an outer tubular element 90 having a downwardly directed open end telescopically receiving therein an inner housing or tubular element 92. Spring means 99, of any conventional variety, as for example the helical wound coil spring illustrated, are carried within the housings 90 and 92 and accommodate resilient movement therebetween. To complete the adjustable means appropriate pivot pin connections 96 and 98 secure opposed ends of each device 88 to the seat aperture 86 and a selected aperture 82.

The shock absorber device 88 includes a stop bolt 100 which extends axially through the spring 99 to limit resilient extensible movement of the tubes 90 and 92, to maintain the spring 99 in slightly pressured condition and to render the entire arrangement susceptible to convenient lifting of the bicycle by grasping the seat or other portions of the frame 46.

Attention is now directed to FIGUREE 5, a free body line diagram illustrating the action of the bicycle components during use. To better understand FIGURE 5, the symbol RA denotes the axis of rotation of the rear axle 34 of FIGURE 1. The symbol B, on the other hand, denotes the pivot axis 20 of FIGURE 1. Again the symbol A represents the axis of rotation 72 of the front wheel of FIGURE 1, while the symbols C and D represent the point of pin connection of the adjustable means 81 to the seat 50 and bracket 22, respectively. The symbol E, on the other hand, represents the axis of the pedal mechanism 40. It will be apparent from reference to FIGURE 5 that the only relatively fixed point on the entire vehicle is the rear axle RA. Considering an intermediate mode of the bicycle, it will be understood that the line RA–B defines an imaginary line from the pivot B to the rear axle RA. The line BC is indicative of the horizontal element 48 of the frame 46, while the line C–D represents the adjustable means 81. In use the vehicle may be adjusted either fixedly by mechanical repositioning of the pivots of the shock devices 88 on the bracket 22 or frame adjustment may occur by virtue of resilient extension or compression of the springs 99. The dotted line A', B', C', and D' is illustrative of the relative position of the parts showing a maximum vertical adjustment in the downward direction. In this condition the front axle has moved to the point A' while the pivot has arched downwardly about the rear axle RA to the point B'. The effect of such repositioning is to increase the wheel base and to lower the position of the seat relative to the surface of the ground. Pivotal connection D has been moved downwardly to D' and arcuately forwardly relative to the vertical.

Line A"–B"–C"–D" is illustrative of the various positions of the parts when maximum vertical adjustment is undertaken in the upward direction. In this condition, it will be apparent that the front axle is moved substantially rearwardly in a horizontal direction to point A", thus shortening the wheel base of the vehicle importantly. The pivot has moved to B" position arcuately about the rear axle RA and the seat is moved to C" position, somewhat angled upwardly relative to the horizontal but still generally horizontal. Pivot connection D" is moved upwardly and in a counter-clockwise direction about the rear axle RA. It will be noted also that in the various positions illustrated in FIGURE 5, the pedal axis E takes up a new vertical position as it is moved arcuately about the rear axle RA. Thus when the seat height is moved to a minimum with reference to the ground the pedal axis moves downwardly to position E'. Alternately, when the seat has moved to a maximum position as evidenced by C" the pedal axis moves upwardly to E" position. In both instances, the pedal axis E moves into a position more comformable to the seat position of the rider. It will also be noted by the extensions of the various lines AB that as the seat position is moved downwardly closer to the ground to accommodate a shorter rider, the handle bars are moved rearwardly toward the seat and provide a shorter steering distance appropriate for the reach of the shorter rider. Alternately, as the seat is moved upwardly to a maximum vertical height position, the handle bars pivot forwardly, again conformable to a rider who would be expected to have increased stature and longer arm reach.

Point C, which represents the point of pivotal connection 98 to the seat 50, may, when viewed in side elevation, be considered to reflect the effective center of seat 50. That is a line L (FIGURE 1) indicating the approximate center of the seat may be considered to be in predetermined relation to center of gravity of the body of the rider. Further, line L is directed toward the rear axle 34 of the cycle. Thus all reactive forces created in the frame by the action of pedal applied torque are dissipated directly to the ground and efficient transmission of pedal torque to the driving rear wheel results. Loss of energy combating the suspension means is at a practical minimum. In effect the arrangement virtually reproduces the force transmitting efficiency of prior art rigid frame constructions while affording the comfortable riding qualities of the disclosed resilient suspension.

The action thus achieved presents a vehicle having many desirable advantages. Some of said advantages are readily apparent, for example, as the child's physique changes by natural growth process, the bicycle height may be progressively raised to more readily conform to his changing physical features. It will be noted that not only is the seat raised but the handle bars move forwardly for more comfortable manipulation and the pedal axis moves upwardly to maintain a desired relation with the location of the seat. In this connection, it will be noted that the movement of the pedal axis is substantially less than the effective movement of the seat because the radius of arc motion about the rear axle is significantly less than the radius of motion of the seat about the interframe pivot. The advantage of such an arrangement is that while the pedal axis is maintained in comfortable relationship with the seat during height variation the distance between the seat and the pedal axis increases as the height of the bike increases which indirectly reflects the longer leg length of the growing child. Also in all adjusted positions of the cycle, the line of compressive action of the springs 99 is directed substantially directly toward the rear axle and spring force is distributed thereto. Again it will be noted, that as a result of this arrangement, torque applied by the rider to the pedal sprocket 40 is effectively transmitted to the rear driving wheel and not dissipated by artificial compression of springs 99.

Other and less obvious advantages accrue from the structure described. To illustrate, when the effective seat height of the bicycle is at a minimum the wheel base of the vehicle is at a maximum. In this position, the stability of the vehicle is substantially increased, making it easier to ride for a younger and smaller child. As the height of the vehicle increases conformable to the growing physical stature of the child, the wheel base of the vehicle is significantly reduced, making the bicycle more adaptable to the sharp turning and trick riding which in turn is directly related to the expected increase in skill of the older and physically more competent youngster.

Further, shock loads, that can be expected when the riding child encounters a road obstacle such as a curb or the like, are transmitted to the line of action of the adjustable means 81 interconnecting the seat and rear axle and are cushioned or resiliently absorbed either by virtue of the compression of the series spring means or by the resilient raising of the seat against the weight of the riding child. Particularly, any substantially horizontal shock load thus encountered is effectively transformed or resisted by a vertical force having a line of action approximately through the rear axle of the vehicle. It will be apparent that such a force pattern is effetcive to minimize potential structure failures in the vehicle.

In addition stresses due to applied moments at the pivotal connection between the frames are minimized both in the longitudinal vertical plane of the bike as well as transversely thereof. Thus an important disadvantage of prior art bikes which resulted in structural failure particularly at the front fork is eliminated.

Finally, the riding qualities of the vehicle are substantially improved over prior art structures. It has been found that the bike may be navigated over extremely rough terrain and easily manipulated under conditions where it was virtually impossible to maintain balance with the relative rigid frame bicycles. Also, the "feel" of the vehicle is greatly enhanced, thus increasing the enjoyment value of the bicycle as a play article. From a visual standpoint the design readily conforms to the appearance of a motorcycle, and, if desired, a simulated motor unit may be mounted on the bike as shown on the dotted lines at M. The frame segments 14 may be designed to simulate exhaust pipes. Patently, such an appearance enhances the play value of the article.

Having considered the operation of a preferred embodiment of the invention, attention is directed to the remaining figures of the disclosure which illustrate some alternate arrangements that may be employed. For purposes of simplification, only the novel aspects of the alternate embodiments will be described. For example, in the structure disclosed in FIGURES 6 through 8, the lower frame 110 is of tubular form and comprises an upwardly arced segment 112 at the rear portion thereof. It is suggested that the arc employed in the segment 112 be of uniform radius about the pivot 114. The hollow tube segment 112 telescopically receives arced bar 116, the latter incorporating a relatively horizontal plate 118 welded to the upper end thereof. A conically coiled spring 120 is interposed between the plate 118 and the lower surface of the seat 122. To maintain unit integrity, opposed ends of the spring 120 may be connected, respectively, to the plate 118 and the seat 122, as for example by welding. The utilization of a conical spring 120 presents certain advantages, namely, at relatively light loads the resistive force offered thereby is highly resilient, and, as the spring coils approach closure, the resistive force increases substantially and becomes noticeably less resilient. Again, however, forces developed in the spring 120 are distributed substantially directly to the rear axle. Height adjustment is achieved by telescopically resetting the bar 116 within the tube 112. Because of the fact that tube 112 is on a radius about pivot 114, spring 120 maintains a fixed position relative to seat 122 throughout the entire range of height adjustment.

The lower frame 110, as previously noted comprises a single tube element having a pivot bracket 128 at the upper end thereof. The steering housing 130 is slotted as at 132 to receive the pivot bracket 128 which is connected thereto by virtue of the pivot pin 114. Bearing means 134 may be positioned on opposed sides of the bracket 128.

Rearwardly, the frame 110 and particularly the segment 112 has welded thereto a U-shaped rearwardly directed tubular fork 136. The fork carries the rear wheel and fender structure in the conventional manner.

Directing attention to FIGURE 9, it will be seen that a lower frame 140 is again pivotally connected to the steering column as at 142. At the left portion of the frame 140, an upwardly directed linear tubular segment 144 is provided, said tubular segment 144 telescopically receiving linear bar element 146. Spring plate 148 is secured to the upper end of the bar 146. Conical coil spring 150 is weldably secured to the plate 148 and the upper or larger coils of the spring 150 abut the lower side of seat 152. Directing attention to FIGURE 10 it will be seen that a housing plate 154 is secured to the seat 152 and in spaced relation to the under surface thereof. The plate 154 is longitudinally slotted as at 156 to a transverse dimension which is less than the diameter of the coils of the spring 150 that are interposed between the plate 154 and the seat 152. It will thus be apparent that the bicycle integrity is maintained during height adjustment by virtue of the fact that the upper coils engage the upper surface of plate 154 and prevent separation of seat 152. Because of the fact that the bar 146 is linearly extensible, relative longitudinal movement occurs between the spring 150 and seat 152. The longitudinal slot 156 accommodates this relative longitudinal movement, hence, the bicycle height may be easily adjusted. As shown in FIGURE 10, the upper end of tube 144 is slotted and slotted clamping collar 124 is positioned therearound. Bolt 126 serves to compress the end of tube 144 to frictionally lock bar 146 in selected position. It will also be noted that tubular bar 143 replaces the simulated gas tank of the prior embodiments.

FIGURES 11 and 12 illustrate an embodiment of the invention employing only resilient height adjusting means. The lower frame 156 comprises double horizontally parallel bars which extend rearwardly and include upwardly directed segments 158, 158. Immediately above the rear wheel 160, the segments 158 are joined by fixed plate 162. The plate 162 abuts the lower end of a single coiled spring 164, the latter extending upwardly to engage a horizontal seat mounted plate 166. A connecting pin 168 is in slot engagement with the plates 162 and 166 to maintain bicycle integrity during handling. Side plates 170, 170 may depend from the seat to mask the spring arrangement.

The invention as disclosed is by way of illustration only and may be subject to various modifications within the scope of the appended claims.

What is claimed is:

1. In a wheeled vehicle, a first and second frame means, connection means joining the frame means and accommodating relative movement therebetween, wheel means carried by the respective frame means for rollable contact with the ground, each of said wheel means including an axle rotatably connecting said wheel means to an associated frame means, said connection means being located immediately above one of said wheel means, seat means carried by one of said frame means, said seat means including a central portion positioned directly over the axle associated with the other wheel means and resilient means to resist movement between the frames.

2. In a two-wheeled vehicle arrangement, a first frame carrying a rear wheel for rotation about a generally horizontal first axis, a second frame carrying a front wheel for rotation about a normally horizontal front axis, a pivotal connection between the frames about a transverse axis generally paralleling at least one of said first mentioned axes, said pivotal connection between the frames accommodating relative rotational movement between the frames and effective to vary the height and the wheel base of the vehicle, a rider's seat carried by the second frame and having an effective vertical center line related to the center of gravity of the rider, said first frame carrying a pedal axle forwardly of the rear wheel, and spring means interposed between said frames to provide resilient resistance to pivotal motion between the frames, the distance from said first axis to said pedal axle being substantially less than the length of the tangential radius from said pivotal connection to said vertical center line.

3. In a multi-wheeled vehicle, a first frame having a generally horizontal element extending fore and aft the vehicle, said horizontal element defining a rider's seat at the aft portion thereof, said horizontal element defining a journal receiving bore at the fore portion thereof, said first frame including a downwardly and forwardly directed element and a journal received in said bore, handle bar means connected to the downwardly and forwardly directed element and extending thereabove to accommodate steerable pivotal movement between the elements about the axis of the journal, said downwardly and forwardly directed element carrying an axle at the lower terminus thereof rotatably mounting a front wheel, a second frame comprising a generally horizontal segment spaced from and below said horizontal element, said horizontal segment being connected to an upwardly and forwardly directed segment, a pivotal connection between the last mentioned segment and the horizontal element at the fore portion of the latter, said horizontal segment carrying an axle adjacent the rear terminus thereof rotatably mounting a rear wheel, selectively adjustable means interconnecting the horizontal segment and said seat to vary the spacial distance therebetween and to vary the height of the vehicle and the spacial distance between the front and rear axles, and a pedal axle carried by the horizontal segment intermediate the wheels and intermediate the pivotal connection and the line of adjustment of said adjustable means.

4. A multi-wheeled vehicle according to claim 3, wherein said adjustable means includes flexural means to provide limited resilient movement between the frames, said adjustable means being operative to distribute interframe loads to the rear wheel axle.

5. A multi-wheeled vehicle according to claim 4, wherein said adjustable means further includes mechanical extension means to incrementally and fixedly vary the normal length of the adjustable means.

6. A multi-wheeled vehicle according to claim 5, wherein said extension means comprises tubular means in variable telescopic association, and clamp means to fixedly lock the tubes in selected telescopic relationship to each other.

7. In a multi-wheeled vehicle, a first frame and a second frame, wheel means journally carried by the frames for rotation on front and rear axes, a pivotal connection between the frames accommodating rotative movement therebetween and effective to vary the height and wheelbase of the vehicle, said pivotal connection having an axis paralleling at least one of said axes, a pedal axis paralleling said rear axis, one of said frames carrying a rider's seat, height varying means interposed between the frames, the effective center of said seat being rotatable about said pivotal connection on a first radius upon height variation of the vehicle, said pedal axis being rotatable on a second radius about said rear axis upon said height variation of said vehicle, said first radius being greater than said second radius.

8. A multi-wheeled vehicle according to claim 7, wherein said height varying means includes resilient means operative to provide a flexural resistive force to movement between the frames, said resistive force being effectively and substantially transmitted to said rear axis.

9. A multi-wheeled vehicle according to claim 8, wherein said rider seat is integrally formed with one of said frames.

10. In a multi-wheeled vehicle, a first frame having a generally horizontal element extending fore and aft the vehicle, said horizontal element defining a rider's seat at the aft portion thereof, said horizontal element defining a journal receiving bore at the fore portion thereof, said first frame including a downwardly and forwardly directed element and a journal received in said bore, handle bar means connected to said downwardly and forwardly directed element and extending thereabove to accommodate steerable pivotal movement between the elements about the axis of the journal, said downwardly and forwardly directed element carrying an axle at the lower terminus thereof rotatably mounting a front wheel, a second frame comprising a generally horizontal segment spaced from and below said horizontal element, said horizontal segment being connected to an upwardly and forwardly directed segment, a pivotal connection between the last mentioned segment and the horizontal element at the fore portion of the latter, said horizontal segment carrying an axle adjacent the rear terminus thereof rotatably mounting a rear wheel, adjustable means interconnecting the horizontal segment and the horizontal element to vary the spacial distance therebetween and to vary the height of the vehicle and the spacial distance between the front and rear axles, and a pedal axle carried by the horizontal segment intermediate the wheels and intermediate the pivotal connection and the line of adjustment of said adjustable means, said adjustable means including flexural means to provide limited resilient movement between the frames, said adjustable means being operative to distribute interframe loads to the rear wheel axle, said adjustable means also including mechanical extension means to incrementally and fixedly vary the normal length of said adjustable means, said extension means comprising tubular means in variable telescopic association, and clamp means to fixedly lock the tubes in selected telescopic relationship to each other, said telescopically associated tubular means being centered on a common arc about said pivotal connection.

11. In a multi-wheeled vehicle, a first frame having a generally horizontal element extending fore and aft the vehicle, said horizontal element defining a rider's seat at the aft portion thereof, said horizontal element defining a journal receiving bore at the fore portion thereof, said first frame including a downwardly and forwardly directed element and a journal received in said bore, handle bar means connected to said downwardly and forwardly directed element and extending thereabove to accommodate steerable pivotal movement between the elements about the axis of the journal, said downwardly and forwardly directed element carrying an axle at the lower terminus thereof rotatably mounting a front wheel, a second frame comprising a generally horizontal segment spaced from and below said horizontal element, said horizontal segment being connected to an upwardly and forwardly directed segment, a pivotal connection between the last mentioned segment and the horizontal element at the fore portion of the latter, said horizontal segment carrying an axle adjacent the rear terminus thereof rotatably mounting a rear wheel, adjustable means interconnecting the horizontal segment and the horizontal element to vary the spacial distance therebetween and to vary the height of the vehicle and the spacial distance between the front and rear axles, and a pedal axle carried by the horizontal segment intermediate the wheels and intermediate the pivotal connection and the line of adjustment of said adjustable means, said adjustable means including flexural means to provide limited resilient movement between the frames, said adjustable means being operative to distribute interframe loads to the rear wheel axle, said adjustable means also including mechanical extension means to incrementally and fixedly vary the normal length of said adjustable means, said extension means comprising tubular means in variable telescopic association, and clamp means to fixedly lock the tubes in selected telescopic relationship to each other, said telescopically associated tubular means comprising linearly extensible tubes, said flexural means comprising a conical coiled spring interposed between the tubes and the seat, and an elongated housing on the underside of the seat receiving the larger coils of said conical spring, said housing accommodating linear sliding movement between the seat and the spring upon varying the length of said tubular means.

12. In a multi-wheeled vehicle, a first frame having a generally horizontal element extending fore and aft the vehicle, said horizontal element defining a rider's seat at the aft portion thereof, said horizontal element defining a journal receiving bore at the fore portion thereof, said first frame including a downwardly and forwardly directed element and a journal received in said bore, handle bar means connected to said downwardly and forwardly directed element and extending thereabove to accommodate steerable pivotal movement between the elements about the axis of the journal, said downwardly and forwardly directed element carrying an axle at the lower terminus thereof rotatably mounting a front wheel, a second frame comprising a generally horizontal segment being connected to an upwardly and forwardly directed segment, a pivotal connection between the last mentioned segment and the horizontal element at the fore portion of the latter, said horizontal segment carrying an axle adjacent the rear terminus thereof rotatably mounting a rear wheel, adjustable means interconnecting the horizontal segment and the horizontal element to vary the spacial distance therebetween and to vary the height of the vehicle and the spacial distance between the front and rear axles, and a pedal axle carried by the horizontal segment intermediate the wheels and intermediate the pivotal connection and the line of adjustment of said adjustable means, said adjustable means comprising bracket means connected to the horizontal segment in the immediate area of the rear wheel axle, and resilient shock absorber means having opposed ends thereof pivotally connected to the bracket means and to the seat, respectively.

13. A multi-wheeled vehicle according to claim 12, wherein said bracket means comprises an inverted U-shaped bracket having a plurality of vertically spaced pivot holes therein, said resilient shock absorber being selectively connectable to the respective pivot holes.

References Cited by the Examiner

UNITED STATES PATENTS

| D. 158,960 | 6/1950 | Harley | 280—276 X |
| 470,317 | 3/1892 | Burton | 280—283 |
| 2,768,836 | 10/1956 | Hilber | 280—276 |

FOREIGN PATENTS

| 1,032,268 | 12/1953 | France. |
| 899,595 | 12/1953 | Germany. |
| 522,403 | 4/1955 | Italy. |

KENNETH H. BETTS, *Primary Examiner.*